US009407829B1

(12) United States Patent
McCarthy et al.

(10) Patent No.: US 9,407,829 B1
(45) Date of Patent: Aug. 2, 2016

(54) METHOD FOR MOBILE DEVICE TO IMPROVE CAMERA IMAGE QUALITY BY DETECTING WHETHER THE MOBILE DEVICE IS INDOORS OR OUTDOORS

(71) Applicant: Futurewei Technologies, Inc., Plano, TX (US)

(72) Inventors: Robert McCarthy, Escondido, CA (US); Anthony Mazzola, Ramona, CA (US)

(73) Assignee: Futurewei Technologies, Inc., Plano, TX (US)

( * ) Notice: Subject to any disclaimer, the term of this patent is extended or adjusted under 35 U.S.C. 154(b) by 4 days.

(21) Appl. No.: 14/595,990

(22) Filed: Jan. 13, 2015

(51) Int. Cl.
*H04N 5/238* (2006.01)
*H04N 5/235* (2006.01)

(52) U.S. Cl.
CPC .................................. *H04N 5/2353* (2013.01)

(58) Field of Classification Search
CPC ..... H04N 5/238; H04N 5/235; H04N 5/2351; H04N 5/2352; H04N 5/3537; H04N 9/737
See application file for complete search history.

(56) References Cited

U.S. PATENT DOCUMENTS

| 2009/0079846 | A1 | 3/2009 | Chou | |
| 2011/0267492 | A1 | 11/2011 | Prentice et al. | |
| 2012/0092541 | A1* | 4/2012 | Tuulos | H04N 5/2351 348/333.01 |
| 2013/0083216 | A1* | 4/2013 | Jiang | H04N 9/735 348/223.1 |
| 2013/0137450 | A1 | 5/2013 | Dai et al. | |

FOREIGN PATENT DOCUMENTS

| CN | 101399998 A | 4/2009 |
| CN | 102859990 A | 1/2013 |
| CN | 103959668 A | 7/2014 |
| JP | 2001-339733 A | 12/2001 |

OTHER PUBLICATIONS

International Application Serial No. PCT/CN2015/098692, International Search Report mailed Mar. 16, 2016, 6 pgs.
International Application Serial No. PCT/CN2015/098692, Written Opinion mailed Mar. 16, 2016, 4 pgs.

* cited by examiner

*Primary Examiner* — Tuan Ho
(74) *Attorney, Agent, or Firm* — Schwegman Lundberg & Woessner, P.A.

(57) ABSTRACT

Various disclosed embodiments include methods and systems that automatically adjust camera functions of an electronic device to provide improved image quality by determining whether the electronic device is being operated indoors or outdoors.

20 Claims, 7 Drawing Sheets

METHOD FOR MOBILE DEVICE TO IMPROVE CAMERA IMAGE QUALITY BY DETECTING WHETHER THE MOBILE DEVICE IS INDOORS OR OUTDOORS

TECHNICAL FIELD

The present disclosure relates generally to improving camera image quality by detecting whether a mobile device that includes the camera is indoors or outdoors.

BACKGROUND

Lighting conditions affect the quality of digital images taken by still and video cameras. Automatic exposure control of a camera is generally achieved by detecting the brightness of an object with a light metering device, determining an exposure value based on the object brightness and the sensitivity of the imaging system, and driving the diaphragm and the shutter according to the exposure value. However, in such cases where the exposure determination is based solely on the object brightness and the sensitivity of the imaging system, the resulting photographs often do not convey the appearance that the photographer intended to communicate. In addition, capturing an image of an object in the foreground under backlighting conditions can result in an object of interest appearing darker than the background. The details of the object on a captured image are consequently harder to view.

SUMMARY

According to one embodiment, there is provided a method for improving image quality of an image captured by an electronic device in accordance with an indoor/outdoor status of the electronic device, the electronic device including a first sensor and a second sensor different from the first sensor. The method includes receiving sun vector data associated with a position of the sun in the sky, and, in response to a first sensor reading received from the first sensor meeting the first threshold and a second sensor reading received from the second sensor meeting the second threshold, automatically adjusting one or more camera functions of the electronic device to an outdoor setting.

In another embodiment, there is provided an apparatus for improving image quality of an image captured by the apparatus in accordance with an indoor/outdoor status of the apparatus, the apparatus including a first sensor and a second sensor different from the first sensor. The apparatus includes a processor, and memory coupled to the processor including instructions that, when executed by the processor, cause the processor to receive sun vector data associated with a position of the sun in the sky, determine whether a first sensor reading received from the first sensor meets a first threshold, determine whether a second sensor reading received from the second sensor meets a second threshold, and in response to the first sensor reading meeting the first threshold and the second sensor reading meeting the second threshold, automatically adjust one or more camera functions of the apparatus to outdoor settings.

BRIEF DESCRIPTION OF THE DRAWINGS

For a more complete understanding of the present disclosure, and the advantages thereof, reference is now made to the following descriptions taken in conjunction with the accompanying drawings, wherein like numbers desiynate like objects, and in which.

DETAILED DESCRIPTION

Figure 1:
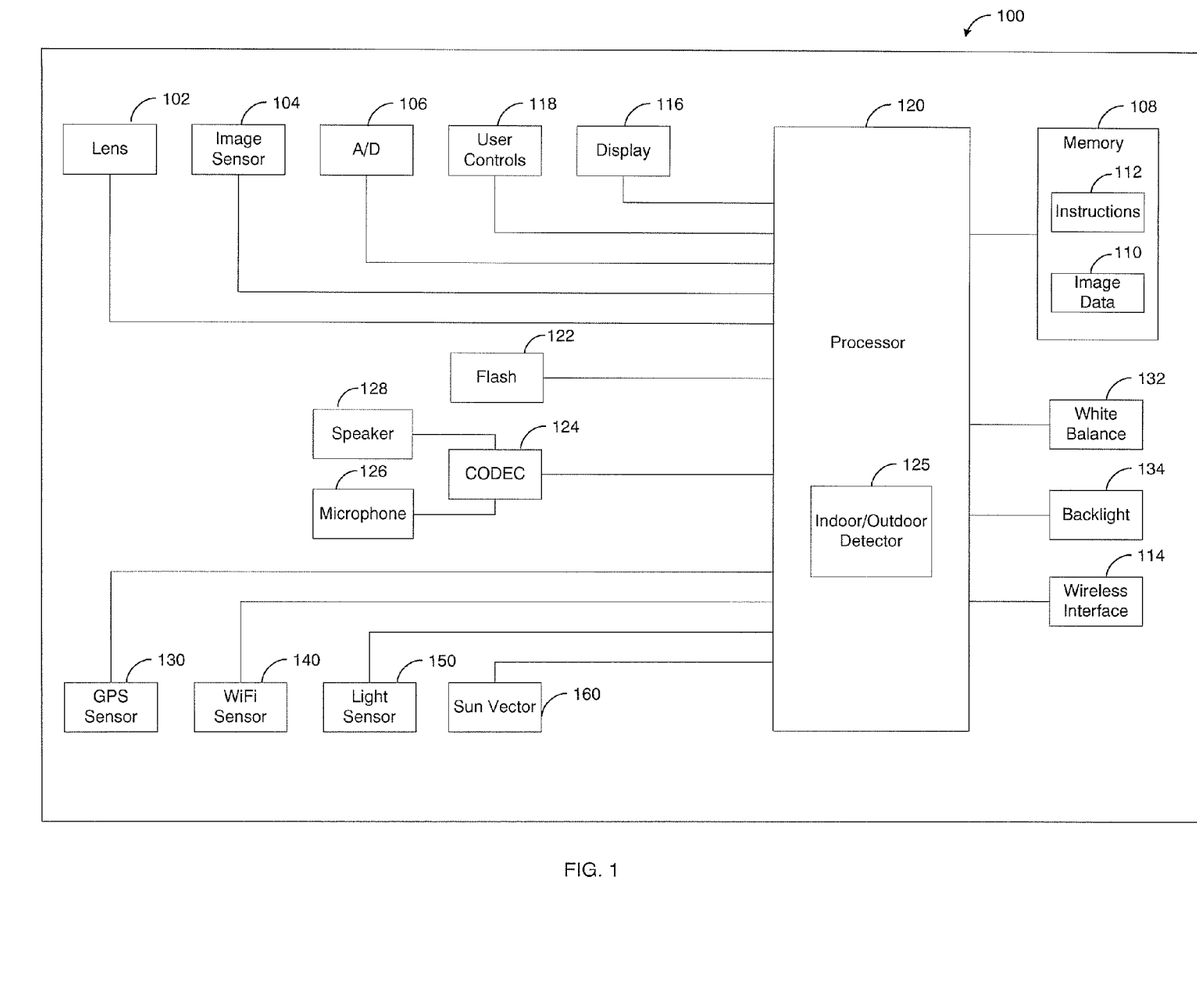
FIG. 1 illustrates a block diagram of an electronic device that improves image quality of an image captured by the electronic device in accordance with an indoor/outdoor status of the electronic device according to one embodiment.

FIG. 1 illustrates a block diagram of an electronic device 100 that automatically adjusts various camera functions to provide improved image quality by determining whether the electronic device 100 is being operated indoors or outdoors. The electronic device 100 includes a lens 102 having an adjustable aperture. The lens 102 may be a zoom lens that is controlled by zoom and focus motor drives (not shown). The lens 102 focuses light from a scene (not shown) onto an image sensor 104 to capture image data that is processed, although this disclosure is not limited in this respect. The image sensor 104 may include arrays of solid state sensor elements, such as complementary metal-oxide semiconductor (CMOS) sensor elements, charge coupled device (CCD) sensor elements, or the like. Alternatively or additionally, the image sensor 104 may include a set of image sensors that include color filter arrays (CFAs) arranged on a surface of the respective sensors. One skilled in the art should appreciate that other types of image sensors could also be used to capture image data. The image sensor 104 may capture still images or full motion video sequences. In the latter case, image processing may be performed on one or more image frames of the video sequence.

The output of the image sensor 104 is converted to digital form by an analog-to-digital (A/D) converter 106 and may be subsequently manipulated by a processor 120. The processor 120 is coupled to a memory 108 and is adapted to generate processed image data 110. The memory 108 is configured to receive and to store the processed image data 110, and a wireless interface 114 is configured to retrieve the processed image data 110 for transmission via an antenna (not shown). The memory 108 may store raw image data. The memory 108 may comprise dynamic random access memory (DRAM), synchronous DRAM (SDRAM), a non-volatile memory, such as Flash memory, or any other type of data storage unit.

The electronic device 100 may include a display 116 that displays an image following image processing. After image processing, the image may be written to the memory 108 and the processed image may be sent to the display 116 for presentation to a user.

A graphical user interface may be displayed on the display 116 and may be controlled in response to user input provided by user controls 118. The user controls 118 may be used to initiate capture of still images and recording of motion images. The user controls 118 may be used to, among other things, turn on the camera, control the lens 102, and adjust camera functions including camera modes such as a portrait mode, a beach mode, an indoor mode, an outdoor mode, etc. The user controls 118 may be used to adjust other camera functions including camera settings such as adjusting a flash 122 setting, adjusting a white balance 132 setting, adjusting a backlight 134 setting, and initiating the picture taking process. At least some of the user controls 118 may be provided by using a touch screen overlay on the display 116. Alternatively or in addition, at least some of the user controls 118 may include buttons, rocker switches, joysticks, rotary dials, or any combination thereof.

A coder/decoder (codec) 124 is coupled to the processor 120 and is configured to receive an audio signal from a microphone 126 and to provide an audio signal to a speaker 128. The microphone 126 and the speaker 128 can be used for telephone conversation. The microphone 126, the codec 124, and the processor 120 can be used to provide voice recognition so that a user can provide a user input to the processor 120 by using voice commands rather than using the user controls 118.

The electronic device 100 illustrated in FIG. 1 uses sensors to monitor the environment that the electronic device 100 is in and can use the monitored data to determine an indoor/outdoor status for the electronic device 100. An indoor/outdoor detector 125 is configured to receive data from the sensors and to determine an indoor/outdoor status based at least in part on the received sensor data. The quality of images obtained by the electronic device 100 can be improved by automatically determining whether the electronic device 100 is being operated indoors or outdoors and automatically setting one or more of the camera modes and/or one or more of the camera settings described above.

For example, the electronic device 100 illustrated in FIG. 1 can use a GPS sensor 130 to help determine the indoor/outdoor status by monitoring received signal strength from one or more GPS satellites. In some instances, the number of visible satellites and their received signal strength indicator (RSSI) can give an indication as to whether the device is indoors or outdoors. For example, a strong RSSI can infer that the device is outdoors. The system may, optionally, also receive or derive Global Navigation Satellite System (GNSS) readings. One drawback to GPS sensors is that their performance degrades without line-of-sight paths to the GPS satellites, such as when an electronic device is in an indoor environment. In addition, inaccurate determinations can occur if the electronic device is indoors near a window, on the top floor of a building, or outdoors in an urban canyon. Therefore, the electronic device 100 can use the readings from the GPS sensor 130 as a factor during the indoor/outdoor status determination.

Another factor that can be used during the indoor/outdoor status determination is readings from a WLAN or Wi-Fi sensor. For example, the electronic device 100 can use a Wi-Fi sensor 140 to monitor signals at unlicensed frequencies. The Wi-Fi sensor 140 can be used by the electronic device 100 to help determine the indoor/outdoor status of the electronic device 100. In some instances, the number of visible Access Points (APs) and their RSSI can give an indication as to whether the electronic device 100 is indoors or outdoors. For example, sensing a strong RSSI from one or more APs can infer that the electronic device 100 is indoors, and sensing no APs with strong RSSI is an indication that the electronic device 100 is outdoors.

Another factor that can be used during the indoor/outdoor status determination is readings from a light sensor. For example, the electronic device 100 can use a light sensor 150 to help determine the indoor/outdoor status. For example, the range of LUX (i.e., light intensity) values observed outdoors is typically far greater than the range of LUX values observed indoors. Therefore, sensing a high light sensor reading (e.g., above a "high" threshold) can infer that the electronic device 100 is outdoors. Alternatively, for example, sensing a low light sensor reading (e.g., below a "low" threshold), can infer that the electronic device 100 is indoors. It will be appreciated that the "high" threshold and the "low" threshold values can have default values, but these values are also configurable by the electronic device 100 and/or a user.

Figure 2:
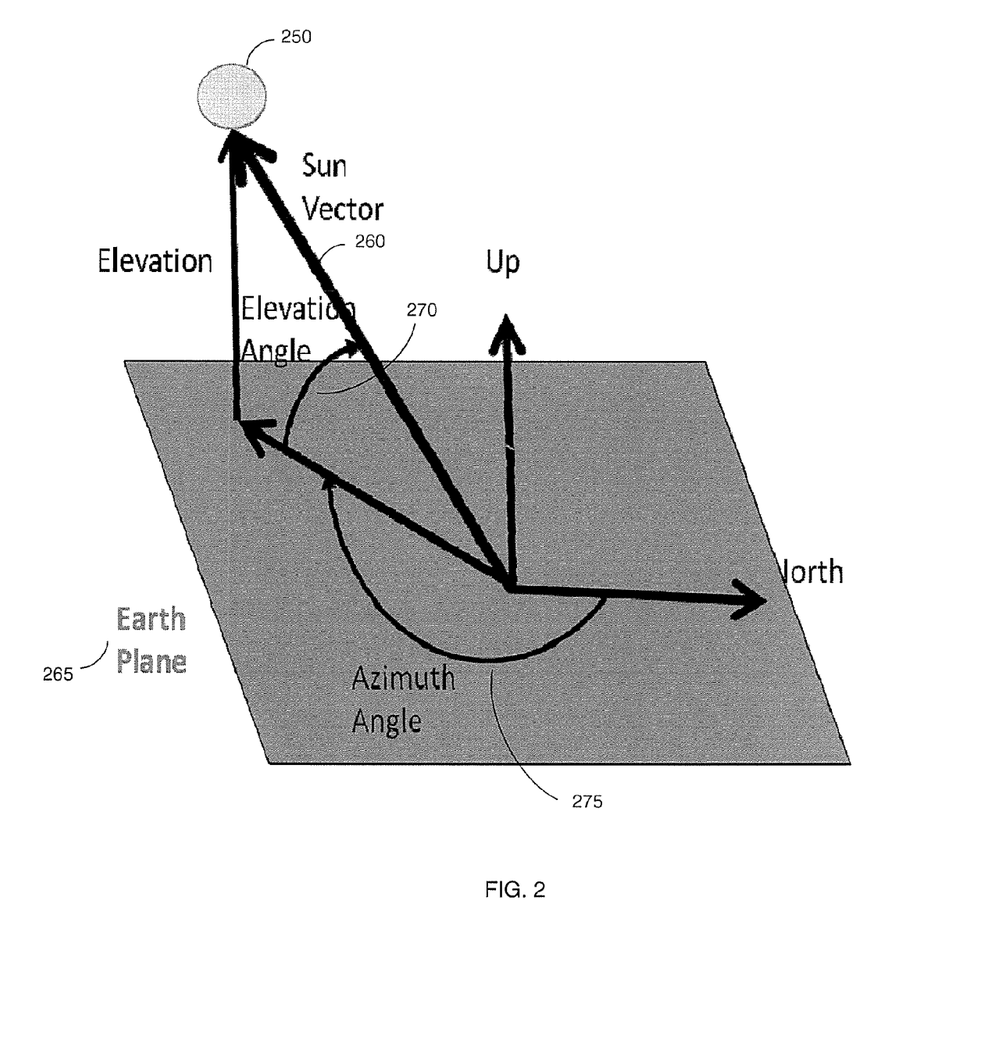
FIG. 2 illustrates a sun vector according to one embodiment.

Another factor that can be used during the indoor/outdoor status determination is a determination of a "sun vector". As illustrated in FIG. 2, a sun vector 260 is associated with a position of the sun 250 in the sky and is a function of time of day, date, and the geographic coordinates of the user of the electronic device 100 on the surface of the earth. To find the sun's position relative to a user of the electronic device 100 at a given time, a calculation of the sun's position in the ecliptic coordinate system can be performed, a conversion to the equatorial coordinate can be performed, and a conversion to the horizontal coordinate system can be performed for the user's local time and position. This determination may be made by the electronic device 100 and may occur when the camera application is running.

As will be appreciated by those skilled in the art, the ecliptic coordinate system is a celestial coordinate system whose origin can be either the center of the sun or the center of the earth, its primary direction is towards the vernal (northbound) equinox, and it has a right-handed convention. It may be implemented in spherical or rectangular coordinates. In addition, as will be appreciated by those skilled in the art, the equatorial coordinate system is a celestial coordinate system that may be implemented in spherical or rectangular coordinates, both defined by an origin at the center of the earth, a fundamental plane that includes the projection of the earth's equator onto the celestial sphere (forming the celestial equator), a primary direction towards the vernal equinox, and a right-handed convention.

The horizontal coordinate system is a celestial coordinate system that uses the observer's local horizon as the fundamental plane. The horizontal coordinates include altitude, also referred to as elevation, and azimuth. For example, in the embodiment illustrated in FIG. 2, earth plane 265 illustrates the fundamental plane, elevation angle 270 illustrates the elevation, and azimuth angle 275 illustrates the azimuth. To illustrate, the elevation angle 270 is the angle between the sun 250 and the earth plane 265, and the azimuth angle 275 is the angle of the sun 250 around the earth plane 265. The azimuth angle 275 in this embodiment is measured from the north increasing towards the east.

Because the elevation and azimuth of an object in the sky changes with time as the object appears to drift across the sky, determination of the sun vector 260 can help predict how bright the outdoors will be. For example, if the sun vector 260 indicates that it should be dark (e.g., the sun is below the horizon), but the LUX reading from the light sensor 150 indicates that it is light, it can be inferred that the electronic device 100 is indoors. Similarly, if the sun vector 260 indicates that it should be light (e.g., the sun is above the horizon), but the LUX reading from the light sensor 150 indicates that it is dark, it can be inferred that the electronic device 100 is indoors.

It will be appreciated that the electronic device 100 illustrated in FIG. 1 can include other sensors to help determine the indoor/outdoor status, such as a Bluetooth sensor (not shown). For example, the electronic device 100 can monitor Bluetooth signals using the Bluetooth sensor to determine the indoor/outdoor status of the device. In some instances, the system 100 can use Bluetooth scans to determine the device classes of proximate devices. For example, identifying the presence of a stationary device (e.g., a desktop computer, a printer) can be an indication that the electronic device 100 is indoors.

The indoor/outdoor detector 125 is configured to receive data obtained from the various sensors 130, 140, 150 and sun vector circuitry 160 and make an indoor/outdoor status determination. For example, the indoor/outdoor detector 125 is configured to fuse the data received from the sensors 130, 140, 150 and the sun vector circuitry 160. The indoor/outdoor detector 125 may be implemented as computer code that is executable at the processor 120, such as computer executable instructions that are stored at a computer readable medium. For example, program instructions 112 may include code to detect an indoor/outdoor status.

Figure 3:
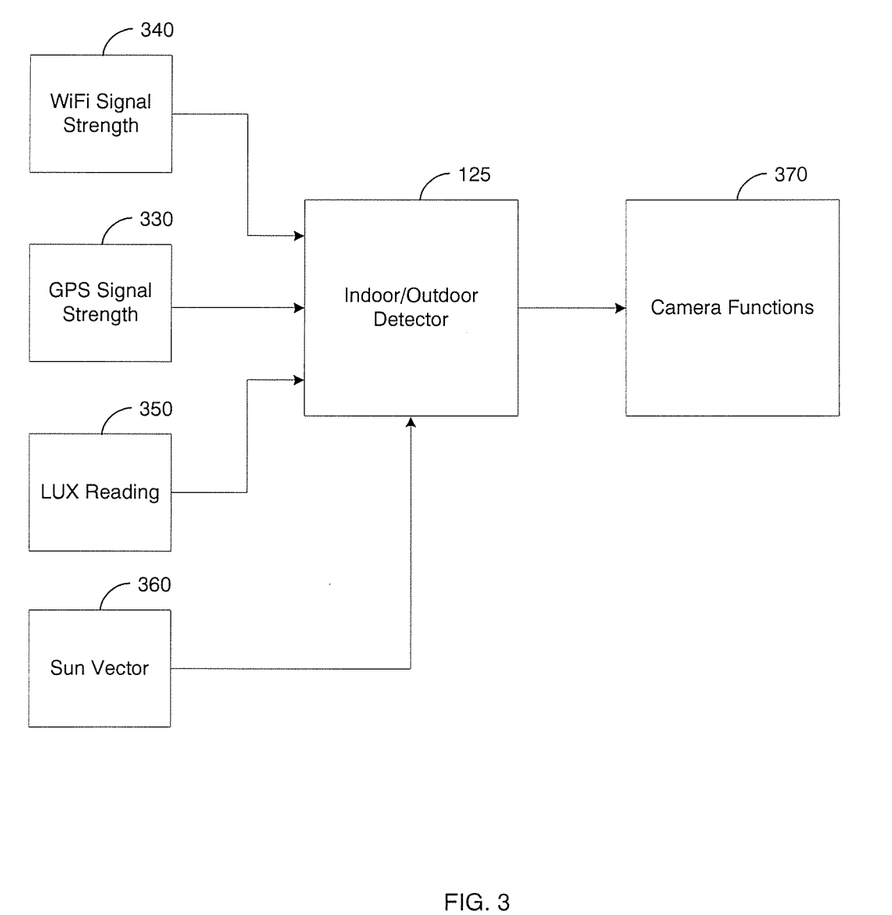
FIG. 3 illustrates a functional block diagram of an indoor/outdoor detector used to determine the indoor/outdoor status according to one embodiment.

FIG. 3 illustrates a functional block diagram of the indoor/outdoor detector 125. As illustrated, the indoor/outdoor detector 125 receives GPS signal strength data 330 (from the GPS sensor 130 of FIG. 1), WiFi signal strength data 340 (from the WiFi sensor 140 of FIG. 1), LUX reading data 350 (from the light sensor 150 of FIG. 1), and sun vector data 360 (from the sun vector circuitry 160 of FIG. 1). The indoor/outdoor detector 125 is configured to fuse the received data, make an indoor/outdoor status determination in accordance with the received data, and automatically control camera functions 370 in accordance with the indoor/outdoor status determination. The camera functions 370 can include camera modes such as a portrait mode, a beach mode, an indoor mode, an outdoor mode, etc. The camera functions 370 can also include camera settings such as a flash setting, a white balance setting, a backlight setting, etc.

Figure 4:
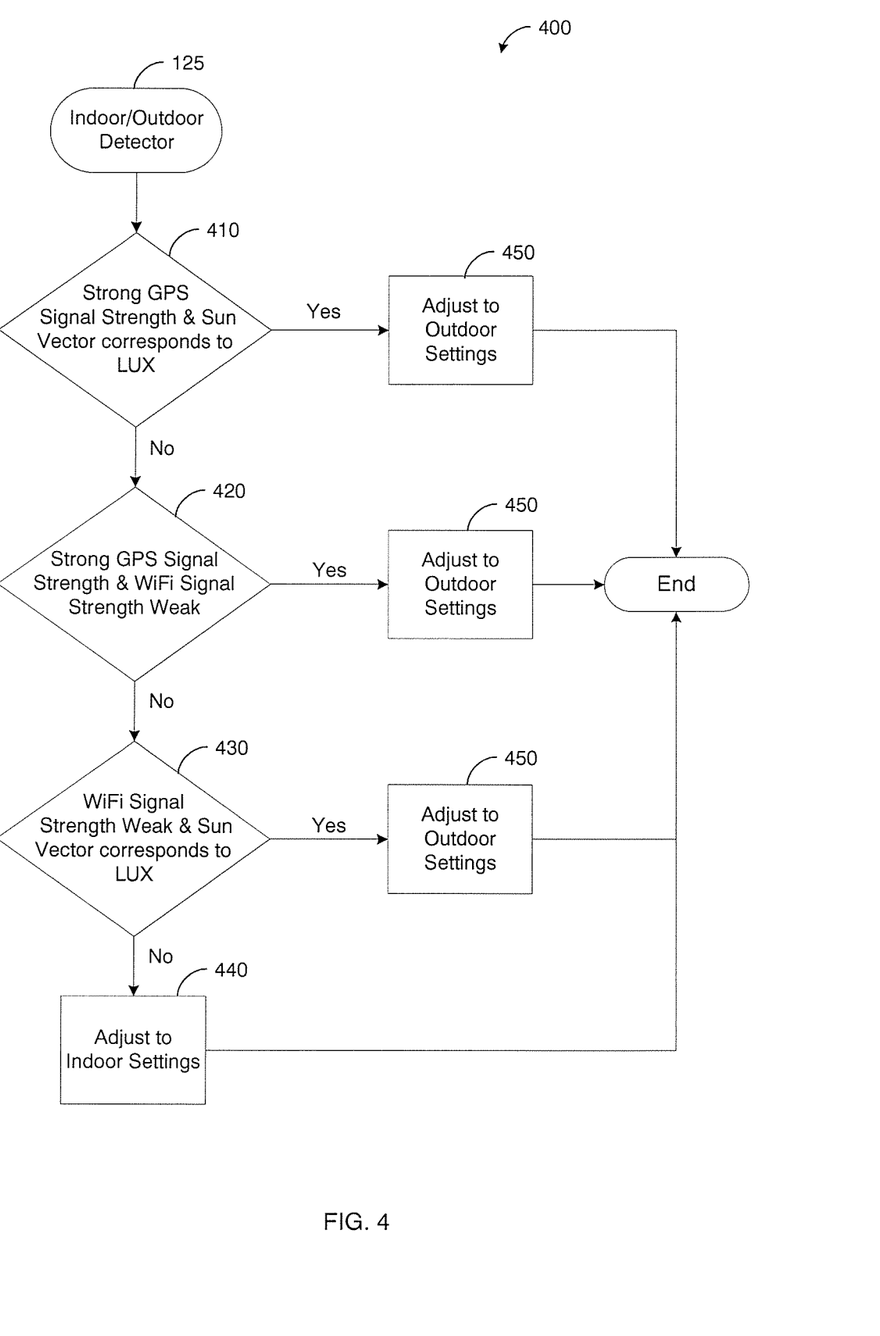
FIG. 4 illustrates a flow diagram of an example method for improving image quality of an image captured by an electronic device in accordance with an indoor/outdoor status of the electronic device according to one embodiment.

Now turning to FIG. 4, there is illustrated a flow diagram of an example method 400 for improving image quality of an image captured by an electronic device in accordance with an indoor/outdoor status of the electronic device. The processing illustrated in FIG. 4 may be implemented in software (e.g., computer-readable instructions, programs, code, etc.) that can be executed by one or more processors and/or other hardware components. In addition, or alternatively, the software may be stored on a non-transitory computer readable storage medium. The method 400 could, for example, be used by the electronic device 100 of FIG. 1.

As illustrated in FIG. 4, the method 400 includes determining whether a strong GPS signal strength is received and determining whether a sun vector determination corresponds to a LUX reading, at step 410. For example, the indoor/outdoor detector 125 receives the GPS signal strength data 330 from the GPS sensor 130 and determines whether the GPS signal strength data 330 is above a GPS signal strength threshold. In addition, the indoor/outdoor detector 125 receives the LUX reading 350 from the light sensor 150 and determines whether the LUX reading is above a LUX threshold, and receives the sun vector data 360 from the sun vector circuitry 160 and determines whether the sun vector data 360 corresponds to the LUX reading 350 from the light sensor 150. If the GPS signal strength data 330 is above the GPS signal strength threshold (e.g., GPS RSSI above threshold, indicating outdoor status), and if the LUX reading 350 from the light sensor 150 is above a "high" LUX threshold (indicating outdoor status), and if the sun vector data 360 indicates that it should be light (indicating outdoor status), then the electronic device 100 can be adjusted to outdoor settings at step 450. If both the GPS signal strength data 330 is below the GPS signal strength threshold (e.g., GPS RSSI below threshold, indicating indoor status), and the sun vector data 360 indicates that it should be dark (indicating indoor status), then the electronic device 100 can be adjusted to indoor settings at step 440.

If either the GPS signal strength data 330 is below the GPS signal strength threshold (e.g., GPS RSSI below threshold, indicating indoor status), the LUX reading 350 from the light sensor 150 is below the "high" LUX threshold (indicating indoor status), or if the sun vector data 360 indicates that it should be dark (indicating indoor status), then the method 400 can include determining whether a strong GPS signal strength is received and determining whether a weak WiFi signal strength is received, at step 420. For example, the indoor/outdoor detector 125 receives the GPS signal strength data 330 from the GPS sensor 130 and determines whether the GPS signal strength data 330 is above the GPS signal strength threshold. In addition, the indoor/outdoor detector 125 receives the WiFi signal strength data 340 from the WiFi sensor 140 and determines whether the WiFi signal strength data 340 is below a WiFi signal strength threshold. If the GPS signal strength data 330 is above the GPS signal strength threshold (e.g., GPS RSSI above threshold, indicating outdoor status), and if the WiFi signal strength data is below the WiFi signal strength threshold (e.g., WiFi RSSI below threshold, indicating outdoor status), then the electronic device 100 can be adjusted to outdoor settings at step 450. If the WiFi signal strength data is above the WiFi signal strength threshold (e.g., WiFi RSSI above threshold, indicating indoor status), then the electronic device 100 can be adjusted to indoor settings at step 440.

If either the GPS signal strength data 330 is below the GPS signal strength threshold (e.g., GPS RSSI below threshold, indicating indoor status), or the WiFi signal strength data 340 is above the WiFi signal strength threshold (e.g., WiFi RSSI above threshold, indicating indoor status), then the method 400 can include determining whether a weak WiFi signal strength is received and determining whether a sun vector determination corresponds to a LUX reading, at step 430. For example, the indoor/outdoor detector 125 receives the WiFi signal strength data 340 from the WiFi sensor 140 and determines whether the WiFi signal strength data 340 is below the WiFi signal strength threshold. In addition, the indoor/outdoor detector 125 receives the LUX reading 350 from the light sensor 150 and receives the sun vector data 360 from the sun vector circuitry 160 and determines whether the sun vector data 360 corresponds to the LUX reading 350 from the light sensor 150. If the WiFi signal strength data 340 is below the WiFi signal strength threshold (e.g., WiFi RSSI below threshold, indicating outdoor status), and if the LUX reading 350 from the light sensor 150 is above the "high" LUX threshold (indicating outdoor status), and if the sun vector data 360 from the sun vector circuitry 160 indicates that it should be light (indicating outdoor status), then the electronic device 100 can be adjusted to outdoor settings at step 450.

If either the WiFi signal strength data 340 is above the WiFi signal strength threshold (e.g., WiFi RSSI above threshold, indicating indoor status), the LUX reading from the light sensor 150 is below the "high" LUX threshold (indicating indoor status), or if the sun vector circuitry 160 indicates that it should be dark (indicating indoor status), then the method 400 can include adjusting the electronic device 100 to indoor settings at step 440.

In general, when it is determined that the electronic device 100 is outdoors, the electronic device 100 can be operated in a default outdoor photography mode. Such a mode can include a default exposure determination process and a default image processing chain, including default white balance and color correction operations that are designed for a typical daylight illumination. Camera settings such as exposure settings, white balance settings, and color correction setting can be automatically set for the electronic device 100. Similarly, when it is determined that the electronic device 100 is indoors, the electronic device 100 can be operated in a default indoor photography mode. Such a mode can include a default exposure determination process and a default image processing chain, including default white balance and color correction operations that are designed for typical indoor lighting illumination. Camera settings such as exposure settings, white balance settings, and color correction settings can be automatically set for the electronic device 100.

Although FIG. 4 illustrates one example of a method 400 for improving image quality of an image captured by an electronic device in accordance with an indoor/outdoor status of the electronic device, various changes may be made to FIG. 4. For example, while shown as a series of steps, various steps shown in FIG. 4 could overlap, occur in parallel, occur in a different order, or occur multiple times. Moreover, some steps could be combined or removed and additional steps could be added according to particular needs.

Figure 5:
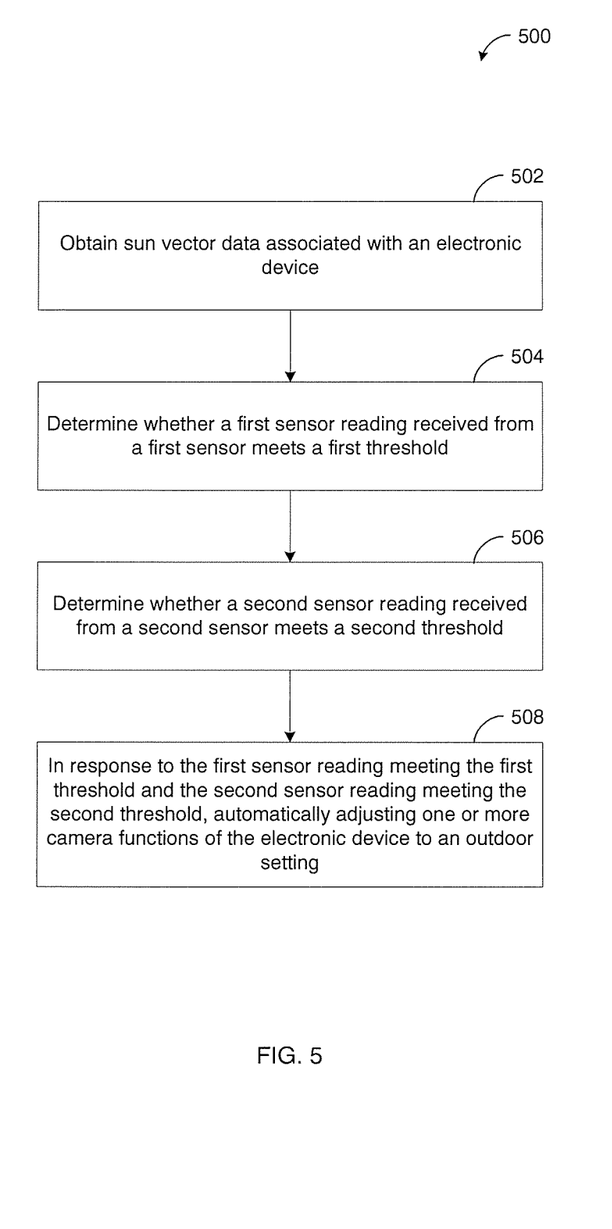
FIG. 5 illustrates a flow diagram of another example method for improving image quality of an image captured by an electronic device in accordance with an indoor/outdoor status of the electronic device according to one embodiment.

FIG. 5 illustrates a flow diagram illustrating a method 500 for improving image quality of an image captured by an electronic device in accordance with an indoor/outdoor status of the electronic device. The processing illustrated in FIG. 5 may be implemented in software (e.g., computer-readable instructions, programs, code, etc.) that can be executed by one or more processors and/or other hardware components. In addition, or alternatively, the software may be stored on a non-transitory computer readable storage medium. The method 500 could, for example, be used by the electronic device 100 of FIG. 1.

The method 500 includes receiving sun vector data associated with a position of the sun in the sky, at step 502. For example, the sun vector circuitry 160 is configured to obtain sun vector data. The sun vector data is associated with a position of the sun in the sky and is a function of both time of day and the geographic coordinates of the user of the electronic device 100 on the surface of the earth. "Receiving", as used herein, can include loading from storage, receiving from another device or process, receiving via interaction with a user, and otherwise.

The method 500 includes determining whether a first sensor reading received from a first sensor meets a first threshold, at step 504. For example, the indoor/outdoor detector 125 receives the GPS signal strength data 330 from the GPS sensor 130 and determines whether the GPS signal strength data 330 is above a GPS signal strength threshold. Alternatively, the indoor/outdoor detector 125 receives the WiFi signal strength data 340 from the WiFi sensor 140 and determines whether the WiFi signal strength data 340 is below the WiFi signal strength threshold.

The method 500 includes determining whether a second sensor reading received from a second sensor meets a second threshold, at step 506. For example, the indoor/outdoor detector 125 receives the LUX reading 350 from the light sensor 150 and determines whether the LUX reading is above the LUX threshold. Alternatively, the indoor/outdoor detector 125 receives the WiFi signal strength data 340 from the WiFi sensor 140 and determines whether the WiFi signal strength data 340 is below the WiFi signal strength threshold.

The method 500 includes, in response to the first sensor reading meeting the first threshold and the second sensor reading meeting the second threshold, automatically adjusting one or more camera functions of the electronic device to outdoor settings, at step 508. For example, if the GPS signal strength data 330 is above the GPS signal strength threshold (e.g., GPS RSSI above threshold, indicating outdoor status), and if the LUX reading 350 from the light sensor 150 is above a LUX threshold (indicating outdoor status), then one or more camera functions of the electronic device can be automatically adjusted to outdoor settings. Alternatively, if the GPS signal strength data 330 is above the GPS signal strength threshold (e.g., GPS RSSI above threshold, indicating outdoor status), and if the WiFi signal strength data is below the WiFi signal strength threshold (e.g., WiFi RSSI below threshold, indicating outdoor status), then one or more camera functions of the electronic device 100 can be automatically adjusted to outdoor settings.

Although FIG. 5 illustrates one example of a method 500 for improving image quality of an image captured by an electronic device in accordance with an indoor/outdoor status of the electronic device, various changes may be made to FIG. 5. For example, while shown as a series of steps, various steps shown in FIG. 5 could overlap, occur in parallel, occur in a different order, or occur multiple times. Moreover, some steps could be combined or removed and additional steps could be added according to particular needs.

Figure 6:
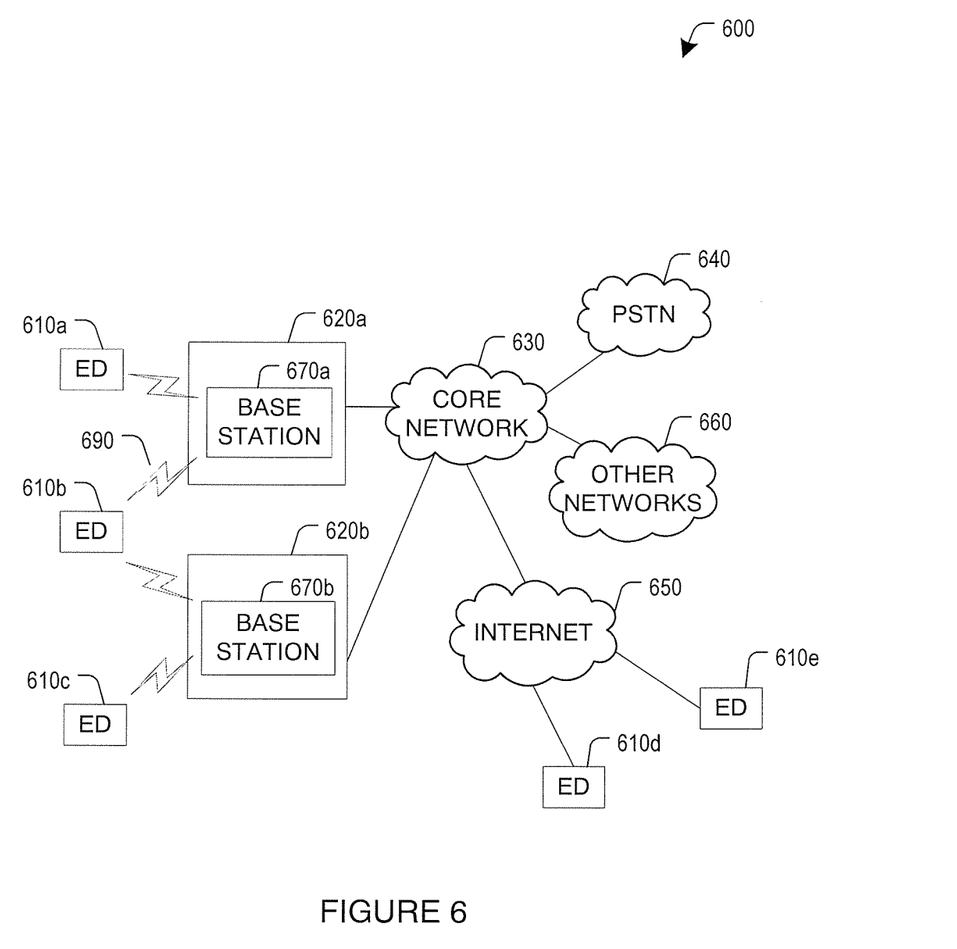
FIG. 6 illustrates an example communication system that may be used for implementing the device and methods disclosed herein according to one embodiment.

FIG. 6 illustrates an example communication system 600 that may be used for implementing the devices and methods disclosed herein. In general, the system 600 enables multiple wireless or wired users to transmit and receive data and other content. The system 600 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 600 includes electronic devices (ED) 610a-610e, radio access networks (RANs) 620a-620b, a core network 630, a public switched telephone network (PSTN) 640, the Internet 650, and other networks 660, and one or more servers 670. While certain numbers of these components or elements are shown in FIG. 6, any number of these components or elements may be included in the system 600. As will be appreciated, each ED 610 may be the electronic device 100 shown in FIG. 1.

The EDs 610a-610e are configured to operate and/or communicate in the system 600. For example, the EDs 610a-610e are configured to transmit and/or receive via wireless or wired communication channels. Each ED 610a-610e represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device, all which include and incorporate a browser application.

The RANs 620a-620b here include base stations 670a-670b, respectively. Each base station 670a-670b is configured to wirelessly interface with one or more of the EDs 610a-610c to enable access to the core network 630, the PSTN 640, the Internet 650, and/or the other networks 660. For example, the base stations 670a-670b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. EDs 610d-610e are configured to interface and communicate with the Internet 650 and may access the core network 630, the PSTN 640, and/or the other networks 660, which may include communicating with the server 670.

In the embodiment shown in FIG. 6, the base station 670a forms part of the RAN 620a, which may include other base stations, elements, and/or devices. Also, the base station 670b forms part of the RAN 620b, which may include other base stations, elements, and/or devices. Each base station 670a-670b operates to transmit and/or receive wireless signals within a particular geographic region or area, sometimes referred to as a "cell." In some embodiments, multiple-input multiple-output (MIMO) technology may be employed having multiple transceivers for each cell.

The base stations 670a-670b communicate with one or more of the EDs 610a-610c over one or more air interfaces 690 using wireless communication links. The air interfaces 690 may utilize any suitable radio access technology.

It is contemplated that the system 600 may use multiple channel access functionality, including such schemes as described above. In particular embodiments, the base stations and EDs implement LTE, LTE-A, and/or LTE-B. Of course, other multiple access schemes and wireless protocols may be utilized.

The RANs 620a-620b are in communication with the core network 630 to provide the EDs 610a-610c with voice, data, application, Voice over Internet Protocol (VoIP), or other services. Understandably, the RANs 620a-620b and/or the core network 630 may be in direct or indirect communication with one or more other RANs (not shown). The core network 630 may also serve as a gateway access for other networks (such as PSTN 640, Internet 650, and other networks 660). In addition, some or all of the EDs 610a-610c may include functionality for communicating with different wireless networks over different wireless links using different wireless technologies and/or protocols. Instead of wireless communication (or in addition thereto), the EDs may communicate via wired communication channels to a service provider or switch (not shown), and to the Internet 650.

Although FIG. 6 illustrates one example of a communication system, various changes may be made to FIG. 6. For example, the communication system 600 could include any number of EDs, base stations, networks, or other components in any suitable configuration.

Figure 7A:
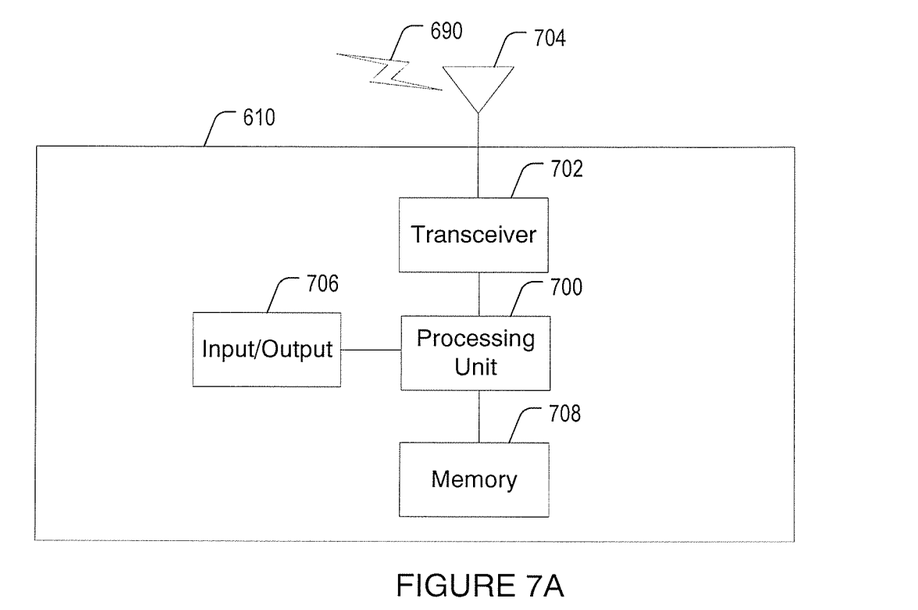
FIGS. 7A and 7B illustrate example devices that can implement improving image quality of an image captured by an electronic device in accordance with an indoor/outdoor status of the electronic device according to one embodiment.
Figure 7B:
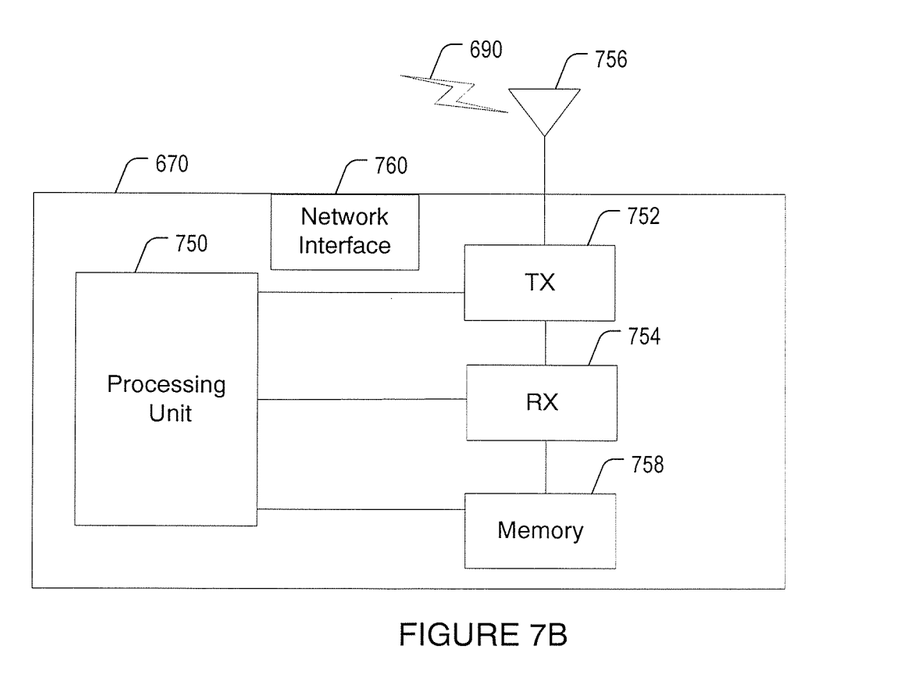

FIGS. 7A and 7B illustrate example devices that may implement the methods and teachings according to this disclosure. In particular, FIG. 7A illustrates an example ED 610, and FIG. 7B illustrates an example server 670. These components could be used in the system 600 or in any other suitable system.

As shown in FIG. 7A, the ED 610 includes at least one processing unit 700. The processing unit 700 implements various processing operations of the ED 610. For example, the processing unit 700 could perform signal coding, data processing, power control, input/output processing, or any other functionality enabling the ED 610 to operate in the system 700. The processing unit 700 also supports the methods and teachings described in more detail above. Each processing unit 700 includes any suitable processing or computing device configured to perform one or more operations. Each processing unit 700 could, for example, include a microprocessor, microcontroller, digital signal processor, field programmable gate array, or application specific integrated circuit.

The ED 610 also includes at least one transceiver 702. The transceiver 702 is configured to modulate data or other content for transmission by at least one antenna or NIC (Network Interface Controller) 704. The transceiver 702 is also configured to demodulate data or other content received by the at least one antenna 704. Each transceiver 702 includes any suitable structure for generating signals for wireless or wired transmission and/or processing signals received wirelessly or by wire. Each antenna 704 includes any suitable structure for transmitting and/or receiving wireless or wired signals. One or multiple transceivers 702 could be used in the ED 610, and one or multiple antennas 704 could be used in the ED 610. Although shown as a single functional unit, a transceiver 702 could also be implemented using at least one transmitter and at least one separate receiver.

The ED 610 further includes one or more input/output devices 706 or interfaces (such as a wired interface to the internet 650). The input/output devices 706 facilitate interaction with a user or other devices (network communications) in the network. Each input/output device 706 includes any suitable structure for providing information to or receiving/providing information from a user, such as a speaker, microphone, keypad, keyboard, display, or touch screen, including network interface communications.

In addition, the ED 610 includes at least one memory 708. The memory 708 stores instructions and data used, generated, or collected by the ED 610. For example, the memory 708 could store software or firmware instructions executed by the processing unit(s) 700 and data used to reduce or eliminate interference in incoming signals. Each memory 708 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 7B, the server 670 includes at least one processing unit 750, at least one transmitter 752, at least one receiver 754, one or more antennas 756, one or more wired network interfaces 760, and at least one memory 758. The processing unit 750 implements various processing operations of the server 670, such as signal coding, data processing, power control, input/output processing, or any other functionality. The processing unit 750 can also support the methods and teachings described in more detail above. Each processing unit 750 includes any suitable processing or computing device configured to perform one or more operations. Each processing unit 750 could, for example, include a microprocessor, microcontroller, digital signal processor, field programmable gate array, or application specific integrated circuit.

Each transmitter 752 includes any suitable structure for generating signals for wireless or wired transmission to one or more EDs or other devices. Each receiver 754 includes any suitable structure for processing signals received wirelessly or by wire from one or more EDs or other devices. Although shown as separate components, at least one transmitter 752 and at least one receiver 754 could be combined into a transceiver. Each antenna 756 includes any suitable structure for transmitting and/or receiving wireless or wired signals. While a common antenna 756 is shown here as being coupled to both the transmitter 752 and the receiver 754, one or more antennas 756 could be coupled to the transmitter(s) 752, and one or more separate antennas 756 could be coupled to the receiver(s) 754. Each memory 658 includes any suitable volatile and/or non-volatile storage and retrieval device(s).

Additional details regarding EDs 610 and server 670 are known to those of skill in the art. As such, these details are omitted here for clarity.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for improving image quality of an image captured by an electronic device in accordance with an indoor/outdoor status of the electronic device, the electronic device including a first sensor and a second sensor different from the first sensor, the method comprising:
   receiving, at the electronic device, sun vector data associated with a position of the sun in the sky; and
   in response to a first sensor reading received from the first sensor meeting a first threshold and a second sensor reading received from the second sensor meeting a second threshold, automatically adjusting, at the electronic device, one or more camera functions of the electronic device to an outdoor setting.

2. The method in accordance with claim 1, further comprising:
   determining, at the electronic device, whether the first sensor reading meets the first threshold; and
   determining, at the electronic device, whether the second sensor reading meets the second threshold.

3. The method in accordance with claim 2, wherein:
   determining whether the first sensor reading meets the first threshold comprises determining whether the first sensor reading exceeds the first threshold, wherein the first sensor comprises a global positioning system (GPS) sensor and the first sensor reading comprises a received signal strength indicator (RSSI) reading; and
   determining whether the second sensor reading meets the second threshold comprises determining whether the second sensor reading exceeds the second threshold, wherein the second sensor comprises a light sensor and the second sensor reading comprises a LUX reading.

4. The method in accordance with claim 3, further comprising:
   determining whether the sun vector data corresponds to the LUX reading; and
   in response to the sun vector data corresponding to the LUX reading, automatically adjusting the one or more camera functions of the electronic device to the outdoor setting.

5. The method in accordance with claim 1, wherein:
   determining whether the first sensor reading meets the first threshold comprises determining whether the first sensor reading exceeds the first threshold, wherein the first sensor comprises a global positioning system (GPS) sensor and the first sensor reading comprises a GPS received signal strength indicator (RSSI) reading; and
   determining whether the second sensor reading meets the second threshold comprises determining whether the second sensor reading is less than the second threshold, wherein the second sensor comprises a WiFi sensor and the second sensor reading comprises a WiFi received signal strength indicator (RSSI) reading.

6. The method in accordance with claim 1, wherein:
   determining whether the first sensor reading meets the first threshold comprises determining whether the first sensor reading is less than the first threshold, wherein the first sensor comprises a WiFi sensor and the first sensor reading comprises a received signal strength indicator (RSSI) reading; and
   determining whether the second sensor reading meets the second threshold comprises determining whether the second sensor reading exceeds the second threshold, wherein the second sensor comprises a light sensor and the second sensor reading comprises a LUX reading.

7. The method in accordance with claim 6, further comprising:
   determining whether the sun vector data corresponds to the LUX reading; and
   in response to the sun vector data corresponding to the LUX reading, automatically adjusting the one or more camera functions of the electronic device to the outdoor setting.

8. The method in accordance with claim 4, further comprising:
   in response to the first sensor reading failing to meet the first threshold and the sun vector data failing to correspond to the LUX reading, automatically adjusting the one or more camera functions of the electronic device to an indoor setting.

9. The method in accordance with claim 5, further comprising:
   in response to the second sensor reading failing to meet the second threshold, automatically adjusting the camera functions of the electronic device to an indoor setting.

10. The method in accordance with claim 1, wherein the sun vector data is based at least in part on a time of day and geographic coordinates of the electronic device on the earth's surface.

11. An apparatus for improving image quality of an image captured by the apparatus in accordance with an indoor/outdoor status of the apparatus, the apparatus including a first sensor and a second sensor different from the first sensor, the apparatus comprising:
   a processor; and
   memory coupled to the processor including instructions that, when executed by the processor, cause the apparatus to:

receive sun vector data associated with a position of the sun in the sky;

determine whether a first sensor reading received from the first sensor meets a first threshold;

determine whether a second sensor reading received from the second sensor meets a second threshold; and in response to the first sensor reading meeting the first threshold and the second sensor reading meeting the second threshold, automatically adjust one or more camera functions of the apparatus to an outdoor setting.

12. The apparatus in accordance with claim 11, further comprising instructions that, when executed by the processor, cause the apparatus to:

determine whether the first sensor reading meets the first threshold by determining whether the first sensor reading exceeds the first threshold, wherein the first sensor comprises a global positioning system (GPS) sensor and the first sensor reading comprises a received signal strength indicator (RSSI) reading; and determine whether the second sensor reading meets the second threshold by determining whether the second sensor reading exceeds the second threshold, wherein the second sensor comprises a light sensor and the second sensor reading comprises a LUX reading.

13. The apparatus in accordance with claim 12, further comprising instructions that, when executed by the processor, cause the apparatus to:

determine whether the sun vector data corresponds to the LUX reading; and in response to the sun vector data corresponding to the LUX reading, automatically adjust the one or more camera functions of the electronic device to the outdoor setting.

14. The method in accordance with claim 11, further comprising instructions that, when executed by the processor, cause the apparatus to:

determine whether the first sensor reading meets the first threshold by determining whether the first sensor reading exceeds the first threshold, wherein the first sensor comprises a global positioning system (GPS) sensor and the first sensor reading comprises a GPS received signal strength indicator (RSSI) reading; and determine whether the second sensor reading meets the second threshold by determining whether the second sensor reading is less than the second threshold, wherein the second sensor comprises a WiFi sensor and the second sensor reading comprises a WiFi received signal strength indicator (RSSI) reading.

15. The method in accordance with claim 11, further comprising instructions that, when executed by the processor, cause the apparatus to:

determine whether the first sensor reading meets the first threshold by determining whether the first sensor reading is less than the first threshold, wherein the first sensor comprises a WiFi sensor and the first sensor reading comprises a received signal strength indicator (RSSI) reading; and determine whether the second sensor reading meets the second threshold by determining whether the second sensor reading exceeds the second threshold, wherein the second sensor comprises a light sensor and the second sensor reading comprises a LUX reading.

16. The apparatus in accordance with claim 15, further comprising instructions that, when executed by the processor, cause the apparatus to:

determine whether the sun vector data corresponds to the LUX reading; and in response to the sun vector data corresponding to the LUX reading, automatically adjust the one or more camera functions of the electronic device to the outdoor setting.

17. The apparatus in accordance with claim 13, further comprising instructions that, when executed by the processor, cause the apparatus to:

in response to the first sensor reading failing to meet the first threshold and the sun vector data failing to correspond to the LUX reading, automatically adjust the one or more camera functions of the electronic device to an indoor setting.

18. The apparatus in accordance with claim 14, further comprising instructions that, when executed by the processor, cause the apparatus to:

in response to the second sensor reading failing to meet the second threshold, automatically adjust the one or more camera functions of the electronic device to an indoor setting.

19. The apparatus in accordance with claim 11, wherein the camera functions include one or more camera modes or one or more camera settings.

20. The apparatus in accordance with claim 11, wherein the sun vector data is based at least in part on a time of day and geographic coordinates of the electronic device on the earth's surface.

* * * * *